United States Patent
Burch et al.

(10) Patent No.: US 7,552,468 B2
(45) Date of Patent: Jun. 23, 2009

(54) TECHNIQUES FOR DYNAMICALLY ESTABLISHING AND MANAGING AUTHENTICATION AND TRUST RELATIONSHIPS

(75) Inventors: Lloyd Leon Burch, Payson, UT (US); Douglas G. Earl, Orem, UT (US); Stephen R Carter, Spanish Fork, UT (US); Robert Mark Ward, Highland, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 11/844,532

(22) Filed: Aug. 24, 2007

(65) Prior Publication Data

US 2007/0294750 A1    Dec. 20, 2007

Related U.S. Application Data

(63) Continuation of application No. 10/765,523, filed on Jan. 27, 2004, now Pat. No. 7,299,493, which is a continuation-in-part of application No. 10/676,231, filed on Sep. 30, 2003.

(51) Int. Cl.
*G06F 7/04* (2006.01)
*G06F 15/16* (2006.01)
*G06F 17/30* (2006.01)
*H04L 9/32* (2006.01)
*H04N 7/16* (2006.01)
*H04L 29/06* (2006.01)
*G06F 15/173* (2006.01)
*G06Q 40/00* (2006.01)

(52) U.S. Cl. ................ 726/5; 726/6; 726/7; 726/8; 726/9; 726/10; 726/27; 726/28; 726/29; 713/150; 713/156; 709/223; 709/224; 705/37

(58) Field of Classification Search ............... 726/5; 705/37; 380/25, 28, 9; 709/223, 224.2; 713/150, 713/156
See application file for complete search history.

(56) References Cited

U.S. PATENT DOCUMENTS

| 5,544,322 A | 8/1996 | Cheng et al. |
| 5,560,008 A | 9/1996 | Johnson et al. |
| 5,706,427 A | 1/1998 | Tabuki |
| 5,737,523 A | 4/1998 | Callaghan et al. |

(Continued)

FOREIGN PATENT DOCUMENTS

WO    WO-0079432 A1    12/2000

OTHER PUBLICATIONS

"U.S. Appl. No. 10/765,523, Response filed Jul. 6, 2007 to Non-Final Office Action mailed May 17, 2007", 7 pgs.

(Continued)

*Primary Examiner*—Ayaz R Sheikh
*Assistant Examiner*—Shin-Hon Chen
(74) *Attorney, Agent, or Firm*—Schwegman, Lundberg & Woessner, P.A.

(57) ABSTRACT

Techniques are provided for dynamically establishing and managing authentication and trust relationships. An identity service acquires and evaluates contracts associated with relationships between principals. The contracts permit the identity service to assemble authentication information, aggregated attributes, and aggregated policies which will drive and define the various relationships. That assembled information is consumed by the principals during interactions with one another and constrains those interactions. In some embodiments, the constraints are dynamically modified during on-going interactions between the principals.

15 Claims, 3 Drawing Sheets

U.S. PATENT DOCUMENTS

| | | | |
|---|---|---|---|
| 5,764,958 A | 6/1998 | Coskun | |
| 5,787,175 A | 7/1998 | Carter | |
| 5,818,936 A | 10/1998 | Mashayekhi | |
| 5,841,970 A | 11/1998 | Tabuki | |
| 5,848,232 A | 12/1998 | Lermuzeaux et al. | |
| 5,878,415 A | 3/1999 | Olds | |
| 5,911,143 A | 6/1999 | Deinhart et al. | |
| 5,913,025 A | 6/1999 | Higley et al. | |
| 5,933,498 A | 8/1999 | Schneck et al. | |
| 5,991,810 A | 11/1999 | Shapiro et al. | |
| 5,999,711 A | 12/1999 | Misra et al. | |
| 6,014,135 A | 1/2000 | Fernandes | |
| 6,014,666 A | 1/2000 | Helland et al. | |
| 6,023,765 A | 2/2000 | Kuhn | |
| 6,088,451 A * | 7/2000 | He et al. | 726/8 |
| 6,092,199 A | 7/2000 | Dutcher et al. | |
| 6,108,788 A | 8/2000 | Moses et al. | |
| 6,119,230 A | 9/2000 | Carter | |
| 6,161,139 A | 12/2000 | Win et al. | |
| 6,192,405 B1 | 2/2001 | Bunnell | |
| 6,202,066 B1 | 3/2001 | Barkley et al. | |
| 6,230,271 B1 | 5/2001 | Wadlow et al. | |
| 6,263,446 B1 | 7/2001 | Kausik et al. | |
| 6,308,181 B1 | 10/2001 | Jarvis | |
| 6,314,409 B2 | 11/2001 | Schneck et al. | |
| 6,343,361 B1 | 1/2002 | Nendell et al. | |
| 6,359,900 B1 | 3/2002 | Dinakar et al. | |
| 6,377,692 B1 | 4/2002 | Takahashi et al. | |
| 6,430,575 B1 | 8/2002 | Dourish et al. | |
| 6,434,607 B1 | 8/2002 | Haverstock et al. | |
| 6,487,665 B1 | 11/2002 | Andrews et al. | |
| 6,515,316 B1 | 2/2003 | Wojtowicz et al. | |
| 6,539,482 B1 | 3/2003 | Blanco et al. | |
| 6,718,470 B1 * | 4/2004 | Adams | 726/10 |
| 6,732,100 B1 | 5/2004 | Brodersen et al. | |
| 6,871,231 B2 | 3/2005 | Morris | |
| 6,871,279 B2 | 3/2005 | Sames et al. | |
| 6,891,953 B1 | 5/2005 | DeMello et al. | |
| 6,911,974 B2 | 6/2005 | Asano et al. | |
| 6,957,261 B2 * | 10/2005 | Lortz | 709/226 |
| 6,981,262 B1 | 12/2005 | DeMello et al. | |
| 7,035,828 B2 | 4/2006 | Ketonen et al. | |
| 7,088,822 B2 | 8/2006 | Asano | |
| 7,140,044 B2 | 11/2006 | Redlich et al. | |
| 7,167,564 B2 | 1/2007 | Asano et al. | |
| 7,203,968 B2 | 4/2007 | Asano et al. | |
| 7,224,804 B2 | 5/2007 | Ishiguro et al. | |
| 7,237,256 B2 | 6/2007 | Cheng et al. | |
| 7,299,493 B1 | 11/2007 | Burch et al. | |
| 7,316,027 B2 | 1/2008 | Burch et al. | |
| 7,319,752 B2 | 1/2008 | Asano et al. | |
| 7,346,170 B2 | 3/2008 | Asano et al. | |
| 7,391,865 B2 | 6/2008 | Orsini et al. | |
| 7,467,415 B2 | 12/2008 | Carter | |
| 2001/0034841 A1 | 10/2001 | Shambroom | |
| 2002/0026592 A1 | 2/2002 | Gavrila et al. | |
| 2002/0052798 A1 | 5/2002 | Nishikado et al. | |
| 2002/0062449 A1 | 5/2002 | DePerna et al. | |
| 2002/0095571 A1 | 7/2002 | Bradee | |
| 2002/0144142 A1 | 10/2002 | Shohat | |
| 2002/0178119 A1 | 11/2002 | Griffin et al. | |
| 2002/0184310 A1 | 12/2002 | Traversat et al. | |
| 2003/0002521 A1 | 1/2003 | Traversat et al. | |
| 2003/0014631 A1 | 1/2003 | Sprague | |
| 2003/0023880 A1 | 1/2003 | Edwards et al. | |
| 2003/0037263 A1 | 2/2003 | Kamat et al. | |
| 2003/0046576 A1 | 3/2003 | High et al. | |
| 2003/0061144 A1 * | 3/2003 | Brickell et al. | 705/37 |
| 2003/0070070 A1 | 4/2003 | Yeager et al. | |
| 2003/0115487 A1 | 6/2003 | Andrews et al. | |
| 2003/0172034 A1 | 9/2003 | Schneck et al. | |
| 2003/0172090 A1 | 9/2003 | Asunmaa et al. | |
| 2003/0229623 A1 | 12/2003 | Chang et al. | |
| 2004/0083367 A1 | 4/2004 | Garg et al. | |
| 2004/0088563 A1 | 5/2004 | Hogan et al. | |
| 2004/0128378 A1 * | 7/2004 | Blakley et al. | 709/224 |
| 2004/0187031 A1 * | 9/2004 | Liddle | 713/201 |
| 2004/0210771 A1 * | 10/2004 | Wood et al. | 713/201 |
| 2004/0221043 A1 | 11/2004 | Su et al. | |
| 2005/0055573 A1 | 3/2005 | Smith | |
| 2005/0068983 A1 | 3/2005 | Carter et al. | |
| 2005/0097056 A1 | 5/2005 | DeMello et al. | |
| 2005/0171872 A1 | 8/2005 | Burch et al. | |
| 2006/0020549 A1 | 1/2006 | Stransky | |
| 2006/0075473 A1 | 4/2006 | Moreh et al. | |
| 2006/0080529 A1 | 4/2006 | Yoon et al. | |
| 2006/0178997 A1 | 8/2006 | Schneck et al. | |
| 2007/0143398 A1 | 6/2007 | Graham | |
| 2007/0156659 A1 | 7/2007 | Lim | |
| 2007/0156670 A1 | 7/2007 | Lim | |
| 2007/0156694 A1 | 7/2007 | Lim | |
| 2008/0134286 A1 | 6/2008 | Amdur et al. | |

OTHER PUBLICATIONS

"U.S. Appl. No. 10/765,523, Non-Final Office Action mailed May 17, 2007", 14 pgs.

"EP Search Report", *Received in related matter EP 04104137.7*, (Mar. 1, 2005), 9 pgs.

"European Search Report, Application No. EP 04 10 6396, date mailed Apr. 28, 2005", 4 Pages.

Aarts, Robert, et al., "Liberty ID-FF Bindings and Profiles Specification", *Liberty Alliance Project, Version 1.2*, (2003), 1-61.

Goodwin, R, et al., "Instance-Level access control for Business to-Business Electronic Commerce", *PowerPoint Presentation*, Presented By Vandana Janeja, (2001), 1-48.

Goodwin, R., et al., "Instance-level access control for business-to-business electronic commerce", *IBM Systems Journal*, vol. 41, No. 2, (2002), 303-317.

Hodges, Jeff, et al., "Oasis SSTC: SAML Security Considerations", *Internet Article, 'Online!, www.oasis-open.org*, retrieved Feb. 7, 2005, Sections 5.2.1.1 and 5.4.2, XP002316601, (Nov. 14, 2001), 1-22.

Madsen, Paul, et al., "Liberty Metadata Description and Discovery Specification", *Liberty Alliance Project, Version 1.0*, (2003), 1-33.

Sun Microsystems, Inc., "Java? 2 Platform Enterprise Edition Specification, v1.4", *Sun Microsystems, Inc. User Manual*, Final Release,(Nov. 24, 2003), 1-246.

"U.S. Appl. No. 10/676,231 Response to Restriction Requirement filed Apr. 15, 2008", 5 pgs.

"U.S. Appl. No. 10/765,523 Notice of Allowance mailed Sep. 25, 2007", 6 pgs.

"U.S. Appl. No. 10/770,677 Non Final Office Action mailed Jun. 18, 2007", 10 pgs.

"U.S. Appl. No. 10/770,677 Notice of Allowance mailed Nov. 1, 2007", 9 pgs.

"U.S. Appl. No. 10/770,677, Response filed Sep. 13, 2007 to Non-Final Office Action mailed Jun. 13, 2007", 13 pgs.

"U.S. Appl. No. 10/813,505 Response filed Jul. 1, 2008 to Non-Final Office Action mailed Apr. 1, 2008", 9 pgs..

"U.S. Appl. No. 10/813,505 Non-Final Office Action mailed Apr. 1, 2008", 17 pgs.

"European Application No. 06113570.3 Office Action dated Nov. 16, 2007", 22 pgs.

"U.S. Appl. No. 10/676,231 Non-Final Office Action mailed Jun. 26, 2008.", 19 pgs.

* cited by examiner

TECHNIQUES FOR DYNAMICALLY ESTABLISHING AND MANAGING AUTHENTICATION AND TRUST RELATIONSHIPS

PRIORITY

The present invention is a continuation of co-pending U.S. application Ser. No. 10/765,523 filed on Jan. 27, 2004, entitled "Techniques for Dynamically Establishing and Managing Authentication and Trust Relationships," which is a continuation-in-part of co-pending U.S. application Ser. No. 10/676,231 filed on Sep. 30, 2003, entitled "Policy and Attribute Based Access to a Resource," the disclosures of which are incorporated by reference herein.

FIELD OF THE INVENTION

The invention relates generally to network security, and more specifically to techniques for dynamically establishing and managing authentication and trust relationships.

BACKGROUND OF THE INVENTION

As connectivity to the Internet and to network applications has grown in recent years, so has the need for providing more robust network-oriented techniques for authenticating network entities. Authentication generally includes two components: an identity and a statement which can be used for verifying that identity. For example, a network client can authenticate to network service by providing a client identifier (identity) and a client password (statement for verifying the identity).

Successful authentication can establish a trusted relationship between two entities. During that trusted relationship, statements and requests made between the two entities can be relied upon or assumed to be legitimate. Trusted relationships can provide for secure and seamless interactions between trusted entities during network transactions.

Unfortunately, authentication and trusted relationships between entities are not without a significant amount of problems. First, during authentication confidential and proprietary information about one of the entities may be potentially exposed on a network wire, where it can be maliciously intercepted and used to feign the identity of that entity. Second, an entity may have a plurality of authentication techniques requiring a multitude of different confidential information that the entity uses to authenticate and establish trusted relationships, where each of the different techniques are used depending upon a role or circumstance associated with the entity. Third, an entity may not always be relied upon to represent a specific physical location (e.g., specific Internet Protocol Address). This is so because an entity may be a user that accesses a plurality of different client machines or a user that accesses a portable device which plugs into a variety of different networks or network devices as the user moves. Fourth, different circumstances, locations, or roles of an entity may require changes in the authentication techniques that are used by the entity. Fifth, disparate services seldom share authentication credentials, thus requiring an entity to authenticate multiple times.

Lastly, the identity information of any particular entity can vary substantially depending upon the service or other entity that the entity is authenticating with. Moreover, this disparate identity information can be required in different data formats by the various services and can be stored on a plurality of disparate identity data stores.

Because of the variety of security concerns, authentication techniques, and architectural arrangements of identity information and identity services, a unified mechanism for managing an entity's authentication and trust relationships have heretofore remained elusive in the industry. Consequently, entities are forced to manually manage their own authentication and trust relationships. This causes much transactional inefficiency and frustration as passwords expire (are forgotten) and services change.

Additionally, the problems are not exclusively limited to an entity's perspective (e.g., application or user perspective), because much manual management and support are still required by network administrators to keep everything secure and in synchronization, so that entities can access the resources that they need. In fact, it can become extremely time-consuming for network administrators to continually reset passwords for entities or reissue identity information in different formats as services are added or upgraded.

Thus, improved techniques for dynamically establishing and managing authentication and trust relationships are needed.

SUMMARY OF THE INVENTION

In various embodiments of the invention, techniques are presented for dynamically establishing authentication and trust relationships between principals. An identity service manages contracts on behalf of principals. The contracts permit the identity service to acquire authentication information, aggregated attribute information, and aggregated policies which each principal needs to successfully authenticate and interact with other principals. This information is communicated to principals, who are in need of that information, in order to successfully interact with other principals. In some embodiments, policies associated with the contracts are dynamically altered during interactions between the principals and the alterations are appropriately communicated and managed.

DETAILED DESCRIPTION OF THE INVENTION

Figure 1:
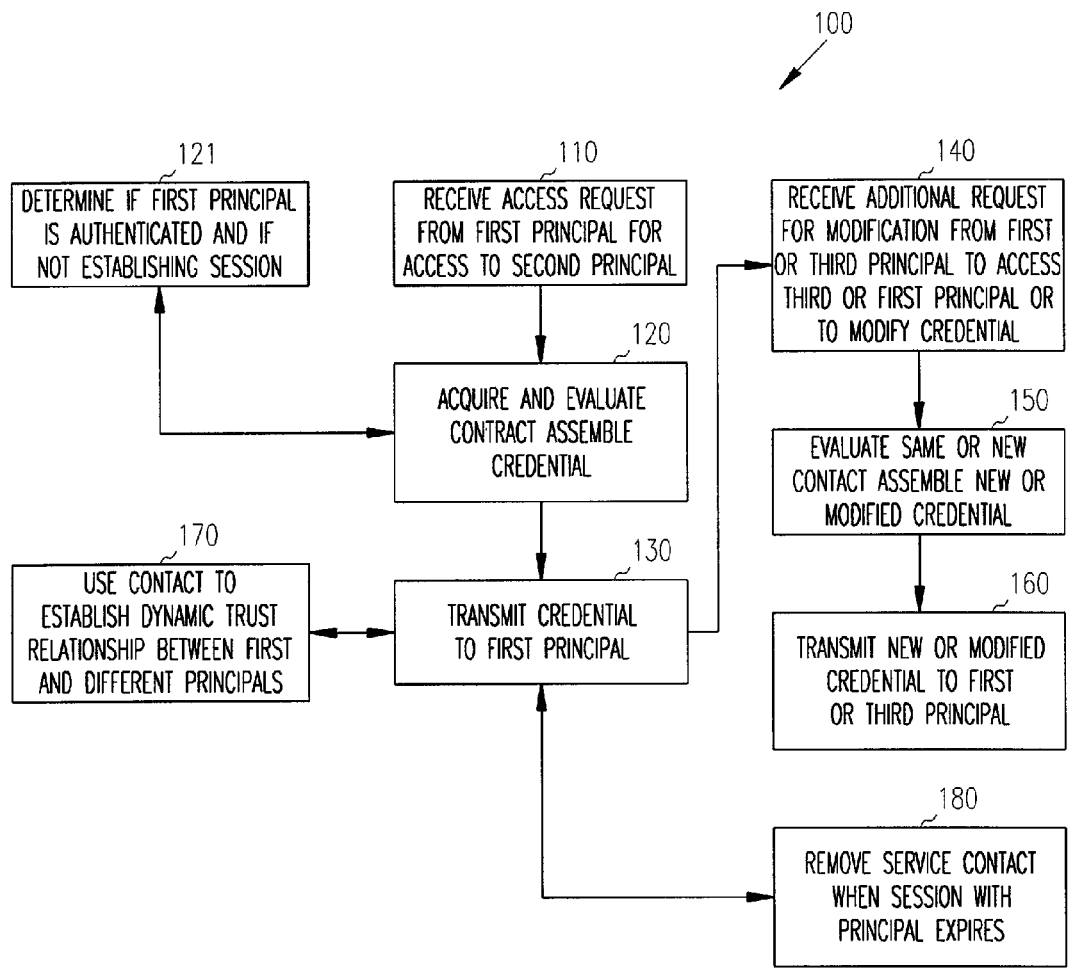
FIG. 1 is a flowchart representing a method for authenticating a principal.

In various embodiments of the invention, the term "principal" is used. A principal is an electronic representation of an entity. An entity can be a resource, a user, an agent, an application, a system, a service, a group, a department, an object, etc. An entity consumes information, provides information, provides a service to other entities over a network, or performs any combination of these operations.

In one embodiment, the term principal is consistent with how that term is generally understood in the security arts. For example, the term principal can be used in the context of Security Assertion Markup Language (SAML) which is an extension of the Extensible Markup Language (XML). SAML is used for securely processing assertions about a user or application (e.g., principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

A SAML encoded statement includes an assertion, a protocol, and a binding. There are generally three types of assertions: an authentication assertion used to validate a principal's electronic identity, an attribute assertion that includes specific attributes about the principal, an authorization assertion that identifies what the principal is permitted to do (e.g., policies). The protocol defines how a SAML processing application will ask for and receive the assertions. The binding defines how SAML message exchanges are mapped to Simple Object Access Protocol (SOAP) exchanges, or other protocol exchanges.

In general terms, SAML techniques improve security between business-to-business (B2B) electronic transactions and business-to-customer (B2C) electronic transactions. The techniques permit one principal to log in with a single transaction to a receiving principal and then use a variety of the receiving principal's disparate services by providing the SAML statements when needed. SAML techniques are not limited to inter-organization relationships (e.g., B2B or B2C); the techniques can be used within a single organization (intra-organization). SAML techniques are supported with a variety of network protocols, such as Hypertext Transfer Protocol (HTTP), Simple Mail Transfer Protocol (SMTP), File Transfer Protocol (FTP), SOAP, BizTalk, and Electronic Business XML (ebXML). The Organization for the Advancement of Structured Information Standards (OASIS) is the standards group for SAML. The techniques of Liberty are enhancements to the SAML techniques and may also be used in connection with various embodiments of this invention.

However, it is to be understood that SAML and Liberty techniques are not needed to perform the teachings of all embodiments of the invention. These techniques complement some embodiments of this invention. In this sense, the integration of SAML and Liberty techniques with some of the embodiments presented herein is intended to be part of certain aspects of this invention, but not all embodiments of this invention are dependent on SAML or Liberty technology.

In a similar manner there are various other existing authentication techniques that may be practiced in connection with some embodiments of this invention. But, once again these other authentication techniques are not necessary for realizing the benefits of all embodiments of the invention. Some of these techniques include Public Key Infrastructure (PKI) techniques including public-private key pairs, digital certificates, biometric authentication, or use of conventional identifications and passwords.

An access request is an electronic request for accessing a principal. That request can be for the principal to perform some operation or for the principal to acquire and deliver some particular desired information. Identity information includes any data that is useful in establishing the identity of a principal, such as passwords, identifiers, biometric data, keys, certificates, and the like.

Security policies refer to allowance or disallowance operations (e.g., reads, writes, creates, deletes) against attribute information associated with a particular principal vis-à-vis other principals. These security policies can be expressed in more complex forms to determine a particular processing context during which operations are permitted or disallowed.

Portions of the security policies identify specific attributes, which define data store fields that identify particular pieces of confidential data housed in an identity data store (e.g., NAME, SSN, etc.). These data store fields (attributes) can be used in combination with identity information to access an identity store and acquire other confidential data about a particular principal, such as, but not limited to, social security number (SSN), credit card numbers, addresses, phone numbers, password secrets, marital status, gender, age, birth date, children, email addresses, serial numbers, registration numbers, and the like.

A contract specifies needed identity information and needed techniques or services required to authenticate a particular principal to another principal. The contract also includes directives that permit aggregated attribute information and aggregated policies to be assembled from one or more identity stores for a particular principal vis-à-vis another principal. A contract is a data structure that can be evaluated, consumed, and used for processing various transactions associated with embodiments of this invention. The contract is essentially a specification as what is required for a particular principal to be authenticated in a given situation. Moreover, the contract provides a mechanism to assemble information needed for interactions of a particular principal in a given situation. The contract may also include a global policy statement that restricts (requires or excludes) how that contract is used for accessing certain other predefined principals from predefined locations with certain other restrictions, such as access only during a certain time of day, calendar date, occurrence of some other predefined event, and the like.

A contract is consumed and evaluated for purposes of assembling authentication information, aggregate attribute information, and aggregate policies for a given principal relationship vis-à-vis a different principal. In some embodiments, a service that manages the contract represents the authentication information as a certificate. That certificate, in some embodiments, may be further expressed as an assertion (e.g., SAML and/or Liberty). The service can combine the certificate (or assertion as the case may be) with the aggregated attribute information and the aggregated policies in a credential data structure. The service transmits the credential data structure to a principal that consumes the embedded information for purposes of successfully interacting with another principal.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

FIG. 1 is a flowchart representing one method 100 for authenticating a principal. The method 100 is implemented as one or more applications or services which reside in a computer-accessible medium and is accessible over a network. In one embodiment, the method 100 is implemented as a service that interfaces with a client service of a principal. A client is a processing device that a principal is using to interact with the client service. The client service is an interface application that interacts with the processing logic of the method 100. The method 100 need not be in operation, but when the method 100 is operational it performs the following techniques for authenticating a principal.

Initially, a first principal makes an access attempt, at 110, directed to a second principal by using a client service accessible on a client of the first principal. The client service is an interface to the processing of the method 100. In one embodiment, the client service is an applet that processes in a World-Wide Web (WWW) browser application on the client, and the processing of the method 100 is a service that interacts with the client service.

Next, at 120, the processing of the method 100 (hereinafter processing) acquires a contract for the first principal with respect to the second principal. In some embodiments, the needed contract exists in a secure data store accessible to and managed by the processing, such that any particular contract is acquired based on identifiers associated with the first and second principals. In another embodiment, an identifier associated with the first principal permits the processing to acquire a global contract associated with that principal and from that global contract the processing uses an identifier for the second principal to dynamically derive or acquire the contract needed first and second principal interactions associated with the access request.

The contract defines authentication information, authentication techniques, and or authentication services which are needed by the first principal to properly authenticate to establish a session and interact with the second principal. That contract will also include directives that permit the processing to acquire aggregated attribute information and aggregated policies from one or more identity stores that are accessible to the processing.

Once the proper contract is acquired from the processing, it can be evaluated, at 120, for a number of purposes. For example, an initial purpose might be associated with determining whether an initial authentication of the first principal is needed for the acquired contract. Accordingly, in this situation, at 121, a check is made based on a first principal identifier, which can be included with the access request, for determining whether the first principal is already authenticated for purposes of this particular access request and acquired contract.

If the principal is not already authenticated, then, at 121, a secure session can be established between the processing and the first principal for purposes of satisfying the processing that the first principal is who he/she purports to be. The processing can satisfy itself as to a true identity of the first principal using automated, manual, or a combination of automated and manual techniques. During the session the processing acquires identifying information about the first principal (e.g., via cookies, identifiers, passwords, biometric data, etc.). The exact technique used and information needed for authenticating the principal is provided in the contract.

Next, at 120, after the first principal is properly authenticated for the acquired contract that defines the relationship between the first and second principals, the processing continues to evaluate the contract for the first principal for purposes of generating, assembling, or acquiring a credential. The credential includes specific authentication information, authentication techniques/services, selective aggregated attributes, and selective aggregated policies associated with the first principal vis-à-vis the second principal.

In one embodiment, the specific authentication information and authentication techniques/services are expressed as an authentication certificate within the credential. This certificate can be used by the first principal to authenticate to or prove an existing authentication with the second principal. For example, in one embodiment, where the second principal is SAML and/or Liberty enabled, the certificate can be expressed as an assertion which the second principal relies on as evidence that the first principal is in fact authenticated. This may be useful in embodiments where the processing authenticates the first principal to the second principal. In still other embodiments, where the second principal is a legacy service, the authentication information and authentication techniques/services is expressed as an identifier and a password pair, which the first principal can provide to the second principal in order to authenticate.

In some embodiments, the actual authentication information (or certificate as the case may be) included within the credential can include alias identity information that the processing substitutes for original identity information associated with the first principal. The processing can update the alias identity information into one or more identity stores that require the original identity information. The first principal is entirely unaware of the alias identity information as is the second principal. When the first principal authenticates to the second principal, the second principal uses the alias identity information to authenticate with an appropriate identity store, since the processing had updated that identity store with the alias identity information, the second principal receives a successful authentication message and the first principal is properly authenticated.

In this last embodiment, alias identity information provides a number of useful benefits. First, original identity information associated with the principal is not unnecessarily exposed on network wires during transactions. Second, since only the processing maintains the mapping between the alias identity information and the original identity information, the original identity information can only be compromised if the processing is compromised. Third, if the alias identity information is compromised it will only be useful for a limited time and for a limited purpose defined by the contract. Fourth, by using alias identity information a principal does not need to manage or be aware of multiple sets of original identity information and does not need to manually change them when they expire or formats change. Fifth, alias identity information can be randomly generated for added security by the processing, such that if any particular alias identity is intercepted its format and contents can not be derived for other situations.

In addition to the authentication information and authentication techniques/services included within the credential, the processing assembles aggregated attributes and policies which the first principal uses in interactions with the second principal. These aggregated attributes and policies are acquired from the proper identity stores based on the directives of the contract. Moreover, the aggregated attributes and policies are included within the credential.

Once a credential is established for the contract and the initial access request, at 130, the credential is transmitted to the first principal. The credential is consumed and processed by the first principal via the first principal's client service for purposes of defining and managing the needed interactions between the first principal vis-à-vis the second principal. During these interactions, the first principal can use any certificate information included within the credential to assert and prove the identity of the first principal to the second principal. Moreover, the aggregated attributes combined with the security policies permit certain confidential data to be acquired and accessed or not accessed during the interactions from one or more identity stores. In some embodiments, the processing can access or acquire certain confidential data on behalf of the first or second principals from the one or more identity stores when requested to do so and if the contract so permits.

In one embodiment, at 140, the processing receives an additional request from the first principal for access to a third principal. In this embodiment, the processing acquires and evaluates, at 150, a new contract that defines the relationship between the first and third principal. The new contract provides the mechanism for the processing to assemble a new or second credential, which includes new authentication information, new authentication techniques/services, new aggregated attributes, and new aggregated policies. At 160, the new or second credential is transmitted to the first principal for use in authenticating with or proving an existing authentication to the third principal and in interacting with the third principal.

In still another embodiment, at 140, a third processing makes a new request to the processing. That new request may desire specific attribute information associated with the first principal. In this embodiment, the processing acquires a new contract for the third principal vis-à-vis the first principal and evaluates it at 150 for purposes of acquiring a new credential for the third principal. That new credential is then transmitted to the third principal at 160 and can be subsequently used by that third principal to authenticate with or prove existing authentication to the first principal and to acquire the needed attribute information about the first principal from the first principal or from one or more identity stores associated with the first principal.

In still more embodiments, at 140, the first principal can dynamically alter an existing relationship with the second principal or a third principal. This is done, if the contract permits and can be achieved in the following manner. The first principal requests a modification to one or more policies defined in the credential. The processing receives this request as a modification to the contract. That modification can be permanent or can be temporary and can be defined in the contract or defined in a global policy associated with the contract. Accordingly, if the contract or global policy permits, the permanent version of the contract or an active temporary version of the contract is updated with the modification. This will result in a modified credential being generated or assembled at 150, and, at 160, that modified credential is transmitted to the first principal. In this way, a first principal can dynamically alter his relationship with a second principal. Furthermore, dynamic modifications do not have to be initiated, in all embodiments, by the first principal. That is, the processing can independently detect changes in the one or more identity stores, independently initiate changes, or receive authorized direction for changes from an entirely different principal which modifies an existing credential of the first principal vis-à-vis a second principal.

Additionally, the processing can revoke credentials or remove active and temporary versions of contracts based on some detected expiring event. That event, can be defined in a particular global policy associated with a particular contract, or can be generated automatically when a session between a particular principal and the processing becomes stale or terminates normally or abnormally.

In still other embodiments, at 170, dynamic trust relationships can be established between the first and different principals during active sessions with the processing. This can be achieved in a variety of manners. For example, consider a first principal associated with a user and a second principal associated with a service, such as an on-line payment service. Consider further that the second principal requires secure communications that utilize public and private key pairs. That is, if the first principal sends a communication to the second principal that communication must be encrypted with the second principals public key, and if the second principal sends a different communication to the first principal it will be encrypted with the first principal's public key. Successful decryption of the communications requires the respective private keys of the first and second principals.

Consider also that the second principal has a static public-private key pair, such that the static public key can be acquired by trusted principals via a third principal (e.g., VERISIGN). In the present example, the processing is in a trust relationship with the first, second, and third principals. The first principal does not have a rooted and static public-private key pair, since the first principal is an end user who uses a portable computing device which physically moves around or an end user who may use different computing devices from time to time. Consequently, the second principal is not in a pre-established and trusted relationship with the first principal at any particular time when the first and second principals desire a trust relationship.

The processing, at 170, creates the desired dynamic trust relationship by receiving a request for the relationship from the first principal. Next, appropriate contracts associated with the first, second, and third principals are acquired and inspected. Moreover, the processing validates that the first, second, and third principals are in trusted relationships with the processing. Based on this evaluation, the processing satisfies itself that the trust relationship is permissible.

Accordingly, the processing instructs the first principal to generate a dynamic public-private key pair and provide the dynamically generated public key to the processing. The processing signs a certificate containing the dynamically generated public key with its own strongly rooted private key an updates this new certificate key to a trusted data store accessible to the second principal. Alternatively, a strongly rooted certificate and private key can be obtained at this time from a service (e.g., VERISIGN) belonging to the first principal and stored in the trusted data store.

The processing transmits this public key certificate to the second principal on informs it that the public into its local trusted data store. The processing also requests the static public key of the second principal from the third principal, in cases where a third principal manages the static public key on behalf of the second principal. In other cases, the processing has the static public key of the second principal or can request the same from the second principal. In any event, the processing then transmits the static public key of the second principal to the first principal. The first principal and the second principal can now securely communicate with one another using there respective public-private key pairs to encrypt and decrypt communications.

As yet another example application of embodiments of the invention, consider the following situation. Suppose, a user (first principal) uses a browser (client service embedded therein to interact with the processing) to initially authenticate (log in) to amazon.com (second principal). The browser authenticates the user to the processing and requests needed identity information for the client service to properly authenticate to amazon.com. The processing checks the contract for the authentication technique and needed identity information. The processing validates that no other restrictions are to be placed on the user for purposes of authentication and assembles the needed service policies and identity attributes which the browser will need to interact successfully with amazon.com. This information is embedded in a credential and transmitted to the browser. The browser passes the identity information included in the certificate to amazon.com directly, whereupon the user is successfully authenticated to amazon.com or the user has successfully asserted that he/she is already properly authenticated to amazon.com via a SAML or Liberty assertion.

Continuing with the present example, consider that the user (first principal) has not stored and does not desire to store certain confidential information (e.g., credit card information) with amazon.com, but during a session with amazon.com the user makes a purchase and attempts to check out (e.g., complete or finalize the purchase).

The user via the browser has the credential from the processing, when amazon.com asks the browser for a credit card number and expiration date. The user's browser can then instruct amazon.com that the purchase can be completed via a third principal, a payment service, such as visa.com. The browser's credential tells it that amazon.com is not permitted to directly receive this type of attribute information and may tell amazon.com to contact a third principal or to contact the processing on details needed for completing this particular transaction. Consequently, amazon.com may directly contact visa.com or indirectly contact Visa.com via the processing. When Vis.com is contacted it may need to know how to authenticate to the user (first principal) in order to acquire needed information (attributes, specifically the user's credit card information).

Accordingly, to complete this transaction visa.com contacts the processing with a request to access the first principal for purposes of acquiring a credit card number (specific attribute) to that user. The processing acquires a contract for a user-vis.com relationship, evaluates it, authenticates visa.com, and produces a credential for visa.com to use to acquire the needed credit card information from the user. Alternatively, the processing authenticates visa.com and acquires the needed credit card information directly from one or more identity stores associated with the user and the processing provides the same directly to vis.com. In any event, vis.com is able to properly debit a user's credit card and transmit notice of payment to amazon.com, which concludes the transaction.

In this last example it is noted that visa.com may have never previously acquired or interacted with the user. The user may have never supplied amazon.com with the credit card number. Moreover, amazon.com did not need a permanently retained user credit card number and expiration date in order for amazon.com to successfully complete the transaction, which was originally initiated by the user. The above provided example is but one of many situations that can be realized with the teachings of this invention.

The embodiments of the processing teach novel techniques that permit a principal to dynamically authenticate and interacted with a variety of other principals. The processing can dynamically establish and manage these relationships. Moreover, the relationships can be dynamically altered. This also permits a principal or the processing to dynamically and temporarily or permanently change or alter relationships.

Figure 2:
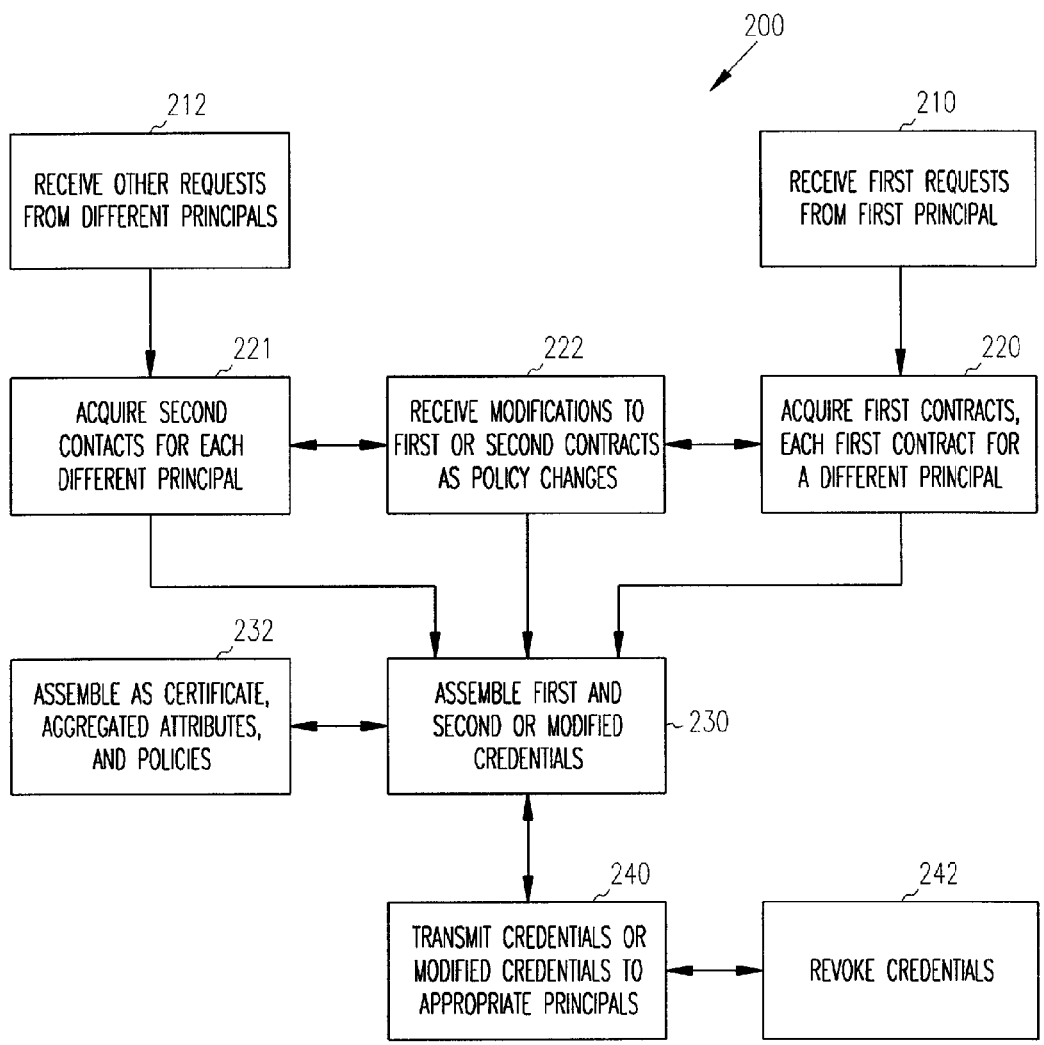
FIG. 2 is a flowchart representing another method for authenticating a principal.

FIG. 2 is a flow chart of another method 200 for authenticating principals. The method is implemented in a computer-readable medium. In one embodiment, the processing of the method 200 (herein after "processing") is implemented as an identity service or authentication service that interacts with client services associated with principals.

Initially, at 210, the processing receives one more first access requests from a first principal. Those first access requests are formed and communicated from the first principals via client services of the first principals. In some embodiments, these client services are browser-enabled interfaces (e.g., applets, etc.) which are capable of interacting with the processing.

Prior to one or more of the first access requests, concurrent with one or more of the first access requests, or subsequent to one or more of the first access requests, at 212, the processing receives one or more other access requests from one or more different principals. Again, in some embodiments, these other access requests originate from client services associated with client processing devices of the different principals.

The access requests are made from one principal for purposes of authenticating to and interacting with another principal. Correspondingly, in manners similar to what has been discussed above with respect to FIG. 1, the processing, at 220, identifies the first principal and acquires first contracts for the first principal vis-à-vis the appropriate different principals defined in the first access requests. That is, each first access request from the first principal is uniquely associated with a particular different principal and associated with a different first contract. In a similar manner, at 221, each other access request from a particular different principal is associated with a particular second contract that defines authentication and interactions between that particular different principal and another principal.

Each acquired contract permits the processing to acquire specific authentication information, authentication techniques/services, aggregated attributes, and aggregated policies. The contract specifies to the processing how to acquire this information from one or more identity stores associated with the appropriate principals that the subjects of a particular instance of a contract.

Once the appropriate information for a particular contract is assembled based on the strictures of that contract, at 230; the processing generates a credential for that particular contract. Thus, each first access request and first contract is associated with a first credential and each other access request and second contract is associated with a second credential. In some embodiments, at 231, one or more of the credentials is assembled as a certificate, aggregated attributes, and aggregated policies. The certificate includes the authentication information and authentication techniques/services. In one embodiment, the actual needed authentication is performed by the processing on behalf of the two principals associated with a particular contract. In these embodiments, the certificate is expressed as an assertion which the two principals can rely upon as evidence that authentication has properly occurred. The assertion permits one of the principals to see how the processing performed authentication with respect to the other principal. In one embodiment, that assertion is a SAML or Liberty assertion.

Once the first and second credentials are assembled based on the directions of the first and second contracts, respectively, the processing, at 240, transmits the appropriate credentials to the original principals that issued the original access requests. These certificates can be used by the principals to authenticate (or prove existing authentication) and interact with one another.

In some embodiments, at 221, any particular principal can dynamically alter existing policies associated with a particular credential which that principal received from the processing. Correspondingly, the processing receives any such policy change request as a request to alter an existing contract for the requesting principal vis-à-vis some other principal. If the contract permits such a change or if a global policy of the contract permits such a change, then, the processing modifies the contract and generates a modified credential, at 230, for the requesting principal that reflects the modified policy and transmits the modified credential to the requesting principal at 240.

In some cases a modification can be permanent, in other cases the modification may be temporary (e.g., expires with the termination of a session of a principal, expires based on an event, expires based on a pre-defined global policy event, expires based on an event defined by the requesting principal, etc.). In still other situations, the modification need not originate from a principal that currently has a particular credential that is the subject of a modified credential. That is, a third principal (e.g., an administrator, someone with more security rights, etc.) can request, if policies and appropriate contracts permit, that certain policies of certain credentials being used by first and second principals be dynamically altered.

As one example of how a modification is useful and dynamic consider the following example. A first principal (Lloyd) is interacting in an interactive chat session with a second principal (group of other users). Lloyd is interacting based on a first credential received from the processing. That first credential provided Steve with the mechanism to authenticate and join in on the interactive chat with the group. How Lloyd receives and issues messages during the chat session is also defined in the first credential.

Suppose now that Lloyd knows that a different principal (Steve) is a member of the group (second principal) and Lloyd does not want Steve to see any posted messages from Steve and does not want Steve to see any messages that Lloyd generates. To achieve this, Lloyd requests a modified first credential from the processing where a policy is altered to exclude Steve from interacting with Lloyd. Assuming, Lloyd's contract with the group permits this policy change, the processing alters the contract (either permanently or temporarily) and issues Lloyd a modified first credential. Now, when Lloyd sends or receives messages to the group during the chat session, Steve is excluded.

Referring back to FIG. 2, at any point that the processing detects an expiring event for any particular credential, the processing, at 242, can revoke that credential and thereby terminate a relationship. An expiring event can be defined in a particular contract, defined in a global policy associated with a particular contract, and/or defined by a system generated event (e.g., time outs for lack of activity, abnormal termination, and normal termination).

A variety of different scenarios are conceivable with the embodiments of this invention, in which dynamic modifications are useful in dynamically altering existing authenticated relationships and interactions. All such scenarios that use the teachings presented herein are intended to fall within the scope of the invention. Thus, the example presented above was intended to be illustrative and not limiting.

Figure 3:
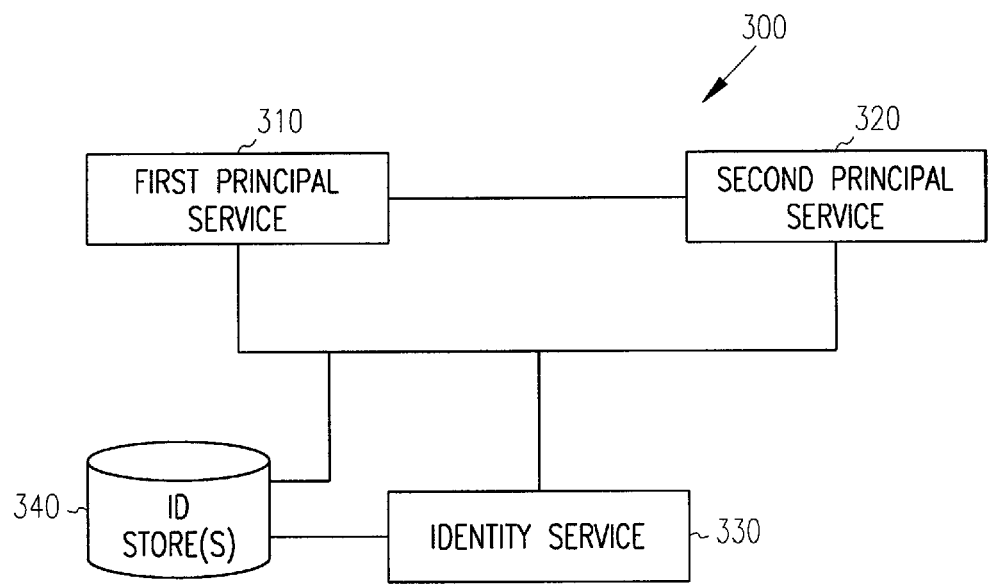
FIG. 3 is a diagram of a principal authentication system.

FIG. 3 is a diagram of one principal authentication system 300. The principal authentication system is implemented in a computer-readable medium and is accessible and processed over a network. The architectural layout of the principal authentication system 300 is presented for purposes of illustration and comprehension only. A variety of other configurations is possible and is intended to fall within the generous scope of the present invention.

The principal authentication system 300 includes a first principal service 310, a second principal service 320, and an identity service 320. In some embodiments, the first principal service 310 is accessible locally on a client (e.g. processing device) of a first principal, and the second principal service 320 is accessible locally on a client of the second principal. In other embodiments, the first and second principal services 310 and 320 are embodied partially in the local environments of each of the principal's client and embodied partially as a separate service that is external to each of the principal's client. The principal services 310 and 320 are interfaces to interacting with the identity service 330.

The identity service 330 manages authentication and trusted relationships occurring between multiple principals, where each separate principal has a principal service 310 or 320 that interacts with the identity service 330. The identity service 330 can be used in manners similar to what has been described above with respect to methods 100 and 200 of FIGS. 1 and 2, respectively.

Primarily, the identity service 330 is contacted by the principal services 310 and 320 when communications between principals are initiated. The identity service 330 will provide the principal services 310 and 330 with credentials that define authentication, aggregated attributes, and aggregated policies which will define and manage sessions occurring between the principals.

However, as was discussed above, the identity service 330 can also be used to dynamically alter selective aggregated attributes or selective aggregated policies that are being used to manage an existing and on-going session between principals. The dynamic modifications can be initiated by principals associated with an existing credential, can be initiated by the identity service 320, or can be initiated by principals with proper authority that are not the subject of a credential being modified.

Additionally, at any point, the identity service 330 can decide that an existing credential needs to be revoked. This can occur based on any defined event that can be trapped and recognized by the identity service 330 which directs the identity service 330 to revoke a credential. When a credential is revoked, the identity service 330 may also elect to remove the associated contract from its active memory, such that that contract has to be re-acquired before it is useful to the identity service 330 in generating or assembling an associated credential.

The identity service 330 acquires a particular contract based on the identities of principals which are to be used in a particular authentication and interactions. The principal services 310 and 320 provide these principal identities to the identity service 330. The contracts can be separately housed in data stores under the control of the identity service 330, or a single global contract can be housed for a particular principal, such that any needed contract is dynamically derived from the global contract as a sub contract by the identity service 330.

Contracts are specifications which inform the identity service 330 as to what authentication information, authentication techniques/services, aggregated attributes, and aggregated policies are needed for a particular principal to principal relationship. In some embodiments, these specifications direct the identity service 330 to particular identity stores 340 where the needed information can be acquired and direct the identity service 330 on how that needed information is to be formatted for use by the principals.

In one embodiment, the identity service 330 performs authentication on behalf of a particular first principal service 310 for authenticating to a second principal service 320, using authentication information and mechanisms required by that second principal service 320. In this embodiment, it may be that the first and second principal services are SAML and/or Liberty enabled, such that once authentication of a first principal (interacting via the first principal service 310) is authenticated to a second principal (interacting via the second principal service 320), the technique used and the fact that authentication was successfully achieved can be represented as an assertion within a credential generated by the identity service 330. That assertion is relied upon and can be validated by the second principal service 320.

In still other embodiments, the identity service 330 does not perform the authentication for the first principal on behalf of the second principal. This may occur when the second principal is a legacy service (e.g. such as a legacy web service) that may require an identification and a password pair for authentication. In these embodiments, the identity service 330 acquires a needed identification and password pair for the first principal and communicates the same to the first principal service 310 in the credential. The first principal service 310 then uses that identification and password pair to directly authenticate to the second principal.

In yet other embodiments, the identity service 330 may elect to depict certain identity information associated with the authentication information included with a credential as aliased identity information. The aliased identity mapping to the original identity is maintained exclusively by the identity service 330 and updated to the appropriate identity stores 340. In this way, the first and second principal services 310 and 320 are unaware of the aliased identity but can communicate successfully with one another as long as the aliased identity is maintained in the identity stores 340. At any point, the identity service 330 may detect and event which forces it to remove the alias identity from the identity stores 340.

Moreover, when an alias identity is used, in some embodiments, a legacy second principal can communicate directly with its identity store 340 or what it believes to be its identity store 340 for purposes of authenticating a first principal. For example, consider a legacy service that represents the second principal. That legacy service authenticates other principals via an identity store 340 by using a Lightweight Directory Access Protocol (LDAP) associated with an LDAP session to pass an identification and password pair to an LDAP service that will query the identity store 340 to determine if the identification and password pair is valid. The identity service 330 may have updated an identity store 340 with an aliased identification and password pair, but the identity service may not have had access to a specific legacy identity store 340 which the legacy service uses. In these situations, an LDAP bind (pointer) associated with the LDAP service that the legacy service accesses can be modified unbeknownst to the legacy service to point to the correct identity store 340 where the aliased information is housed. The LDAP service returns a success indication to the legacy service, and the first principal is successfully authenticated. The legacy service was not modified and it believes that it has just performed authentication in the manner that it always does, and yet, it has not. In fact, the legacy service has been seamlessly and dynamically integrated into the processing of the authentication system 300, by simply changing a pointer or bind associated with the LDAP service that the legacy service typically uses.

A credential generated by the identity service 330 includes not only authentication information, authentication techniques/services, but also includes aggregated attributes and policies which will drive and define interactions between principals associated with a particular relationship and defined by a particular contract. Again, the attributes define identity store 340 data fields associated with a particular principal's confidential data and the policies define how the values of these fields can be accessed, processed, or not accessed and not processed.

Figure 4:
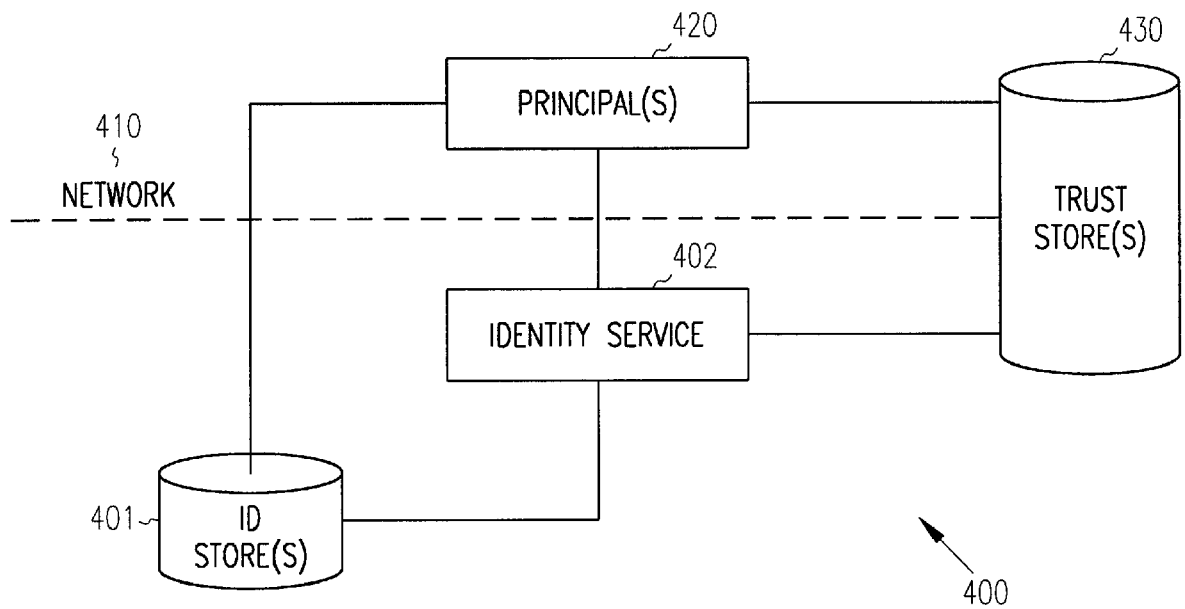
FIG. 4 is a diagram representing another principal authentication system.

FIG. 4 is a diagram of another principal authentication system 400. The principal authentication system 400 is implemented in a computer readable medium and is capable of being accessed configured and installed over a network. Again, the architectural layout and configuration of the principal authentication system 400 is presented for purposes of illustration only and is not intended to limit embodiments of this invention.

The principal authentication system 400 includes one or more identity stores 401 and an identity service 402. The identity service 402 and the identity stores 401 are accessible over a network 410 to one or more principals 420. The principals 420 interact with the identity service 402 via client services associated with computing devices which the principals 420 are using.

The identity service 402 interacts with the principals 420 for purposes of dynamically defining a new principal-to-principal relationship and for purposes of dynamically managing, terminating, or modifying that relationship. When a dynamic relationship is initially established, the identity service 402 acquires a contract for the relationship and evaluates that contract for purposes of assembling or generating a credential that will define and manage that relationship.

A credential includes authentication information, authentication techniques/services, aggregated attributes, and aggregated policies. In one embodiment, the authentication information and authentication techniques/services are represented as a certificate in the credential. The certificate can be expressed as an assertion if desired. Moreover, any needed authentication between any particular principal-to-principal relationship can be achieved by the identity service 402 or can be performed by a requesting principal 420. Additionally, as has been discussed in detail above, some or portions of the authentication information included with the credential can be aliased by the identity service 402.

In some embodiments, each of the principal's 420 environments and the environment of the identity service 402 can include separate trust data stores 430. For purposes of comprehension and ease of illustration these multiple trust data stores 430 are depicted as a single trust data store 430 which straddles the separate environments. In one embodiment, the identity service 402 maintains trusted relationships with each of the principals 420 in its separately maintained trust data store 430. Moreover, each of the principals 420 maintains its trusted relationships with the identity service 402 in its respective trusted data stores 430.

During operation, a particular principal 420 may need or desire a dynamic secure communication and trusted relationship with a different principal 420. However, the individual trusted data stores 430 of these two principals 420 do not include identifiers which would permit such a trusted relationship.

In this situation, the identity service 402 can facilitate and establish the needed dynamic trust relationship and secure communication in the following way. A requesting principal 420 makes the request to the identity service 402, a contract is acquired, a credential generated, and the identity service's 402 trusted data store 430 inspected. If everything is in order to permit the relationship, the identity service 402 acquires any needed public keys for both the principals 420 involved and transmits the same to the other of the principals 420. The identity service 402 then instructs the principals 420 to add the other of the principals 402 and the public key to their respective trust data stores 430. The two principals 420 can now communicate in a secure and trusted manner. This occurred dynamically, and even though one of the two principals 420 may have dynamically generated a needed public-private key pair based on conditions similar to what was described above with the example presented in the description of FIG. 1.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for authenticating a principal implemented in a computer-readable medium and to process on a device for performing the method, comprising:
   receiving an access request from a first principal for access to a second principal, wherein the first principal makes the access request via a client device over a network, and wherein the first principal is a user and the second principal is an application that processes on another device of the network;
   evaluating a contract to acquire a credential for the first principal; and
   transmitting the credential to the first principal for use in interacting with the second principal over the network, wherein the credential includes authentication information, aggregated attributes and aggregated policies for use by the first principal in interacting with the second principal, and wherein the contract identifies identifier information for the first principal and an authentication technique for the first principal to authenticate to the second principal, and wherein the contract includes directives that permit attribute information and policies of the first principal to be assembled from a variety of data stores, and wherein the contract is a specification that indicates how, via the authentication technique, the first principal is to be authenticated to the second principal for a given situation and the contract provides a mechanism, via the directives, for assembling the attribute information and the policies needed for interactions between the first principal and second principal in the given situation, and the contact includes a global policy statement that restricts how the contract is used by the first principal when accessing other principals from predefined locations.

2. The method of claim 1 further comprising determining if the first principal is authenticated based on the contract and if the first principal is not authenticated establishing an authentication session with the first principal to properly authenticate the first principal based on the contract.

3. The method of claim 1 further comprising:
   receiving an additional access request from the first principal for access to a third principal;
   evaluating a new contract to acquire a second credential for the first principal; and
   transmitting the second credential to the first principal for use in interacting with the third principal.

4. The method of claim 1 further comprising removing the contract or revoking the credential when an expiring event is detected during a session with the first principal.

5. The method of claim 1 further comprising:
   receiving a new request from a third principal, wherein the new request desires attribute information associated with the first principal;
   acquiring a new contract for the third principal;
   evaluating the new contract to acquire a new credential for the third principal; and
   transmitting the new credential to the third principal for use in authenticating and interacting with the first principal to acquire the attribute information.

6. The method of claim 1 further comprising:
   receiving a modification to the contract from the first principal;
   determining if the modification is permissible according to the contract;
   updating the contract if the modification is permissible;
   deriving a modified credential from the contract; and
   transmitting the modified credential to the first principal for use in interacting with the second principal.

7. A method for authenticating a principal implemented in a computer-readable medium and to process on a device to perform the method, comprising:
   receiving first requests from a first principal to interact with one or more different principals, wherein the requests are made by the first principal via a client device and provided over a network and wherein the first principal is a user of the client device and the one or more different principals are applications that process on other devices of the network;
   acquiring first contracts for the first principal, wherein each first contract is associated with a different one of the one or more different principals;
   acquiring a second contract for each of the one or more different principals;
   selectively assembling and transmitting first credentials for the first requests for use by the first principal in interacting with the one or more different principals; and
   selectively assembling and transmitting second credentials for other requests associated with and used by the one or more different principals when interacting with the first principal or when interacting with different ones of the one or more different principals, and wherein the first and second contracts include identifier information for the first and second principals, respectively, and also include authentication techniques for the first and second principals to authenticate to one another, and wherein the first and second contracts further include directives for aggregating attributes and policies from a variety of data stores for each of the principals, and wherein each contract is a specification indicating specific authentication information, the authentication techniques, and the directives that indicate how the aggregated attributes and the policies are to be acquired for a particular contract, and wherein evaluation of each contract is done for a particular interaction between the first principal and one of the second principals and produces a particular set of credentials.

8. The method of claim 7 further comprising:
receiving modifications to one or more of the first contracts from the first principal or from one or more of the one or more different principals;
selectively assembling and transmitting modified first credentials to the first principal based on the modifications.

9. The method of claim 7 further comprising:
receiving modifications to one or more of the second contracts from the first principal or from the one or more of the one or more different principals;
selectively assembling and transmitting modified second credentials to the one or more different principals affected by the modifications.

10. The method of claim 7 further comprising:
detecting an event that renders one or more of the first or second contracts stale; and
revoking one or more of the first or second credentials which are affected by the event.

11. A principal authentication system implemented in a computer-readable medium and process on devices of a network, comprising:
a first principal service that processes on a client device of the first principal;
a second principal service that processes on a client device of the second principal; and
an identity service that processes on a different device of the network, wherein the identity service acquires and manages a first contract on behalf of the first principal service and a second contract on behalf of the second principal service, and wherein the identity service provides a first credential to the first principal service and a second credential to the second principal service, the credentials used by the first principal service and the second principal service to interact with one another, and wherein the first and second contracts identify identifier information and authentication techniques for the first and second principals, respectively, and wherein the first and second contracts include directives to aggregate attributes and policies for each of the first and second principals from a variety of data stores, and wherein each contract is a specification indicating specific authentication information, the authentication techniques, and the directives that indicate how the aggregated attributes and the policies are to be acquired for a particular contract, and wherein evaluation of each contract is done for a particular interaction between the first principal and the second principals and produces a particular credential.

12. The principal authentication system of claim 11 wherein the first or the second credential is dynamically modified by the identity service and communicated to the affected principal service.

13. The principal authentication system of claim 12 wherein the dynamic modification to the first or the second credential is driven by modifications received from the first principal service or the second principal service.

14. The principal authentication system of claim 12 wherein the dynamic modification to the first or the second credential is driven by modifications received from a third principal service authorized to provide the dynamic modification.

15. The principal authentication system of claim 11 wherein the identity service includes alias identity information in at least one of the first and the second credentials.

* * * * *